Patented Aug. 27, 1946

2,406,646

UNITED STATES PATENT OFFICE 2,406,646

MANUFACTURE OF CATALYSTS

Glenn M. Webb and Marvin A. Smith, Chicago, Ill., assignors to Universal Oil Products Company, Chicago, Ill., a corporation of Delaware No Drawing. Application July 20, 1942, Serial No. 451,658

7 Claims. (Cl. 252—254)

This is a continuation-in-part of our co-pending application Serial No. 436,464, filed March 27, 1942.

The present invention is concerned with the manufacture of catalysts useful in various processes involving the treatment or conversion of organic compounds, particularly hydrocarbons. More specifically, it is concerned with improved methods for manufacturing catalysts having superior activity in these types of processes.

Broadly, the invention comprises the steps of forming a solution containing an aluminum salt, a compound constituting a source of another catalytic substance usually an oxide to be associated with alumina in the final catalyst, and a volatilizable salt, without effecting precipitation of any of the ingredients of said solution; thereafter evaporating the solvent from the mixture and heating the residue under conditions such that volatilizable materials are substantially removed and the catalytic properties of the mass developed.

In one specific embodiment, the present invention comprises a process for producing an association of alumina with other catalytically active substances comprising forming a solution containing an aluminum salt, a compound constituting a source of said other catalytically active substances, and a salt volatilizable or decomposable without substantial formation of noncombustible residue at a temperature below about 900° C. and preferably not substantially exceeding 850° C., without causing precipitation of the components of said solution, thereafter evaporating the solution to dryness to form a solid mass and heating the solid mass thus obtained to volatilize the volatilizable salt and to develop the catalytic properties of said mass.

The foregoing procedure has been found to yield associations of alumina with other catalytic substances particularly oxides which have superior catalytic activity for various organic reactions when compared with catalyst composites of similar chemical composition, prepared by previously known methods of manufacture. For example: The present method produces a catalyst superior to that prepared by impregnation of granular alumina such as the Activated Alumina of commerce with solutions of compounds yielding catalytically active oxides after heating to evaporate the solvent and to decompose the added compound to form the final oxide composite.

The catalyst produced by the present process has been found to be superior in catalytic activity in comparison with composites of similar chemical composition prepared by so-called co-precipitation methods. In these co-precipitation methods the essential ingredients of the composition are formed by the simultaneous precipitation of the composites, usually followed by washing and heating of the precipitant to form the catalytically active association.

The present process has also been found to yield generally better catalysts than those produced by successive precipitation of alumina and other catalytically active oxides or by the precipitation of other catalytically active oxides on granular alumina.

In addition to the fact that a more highly active catalytic material is formed by this process, other advantages result from the fact that the procedure is essentially very simple. For example: elimination of salts and other impurities is accomplished merely by heating and therefore lengthy washing procedures are made unnecessary. Furthermore, the catalysts prepared by this process possess a greater stability possibly because of the more uniform distribution of the non-aluminiferous compound throughout the body of the alumina. The present catalysts form less carbon for the same degree of conversion and therefore simplify the regeneration problems. Another advantage is that the uniform distribution appears to repress vaporization of volatile catalytic components from the catalyst. For example; molybdena, chromia, and boria possess appreciable vapor pressures at temperatures reached during the use of the catalyst composite, and, therefore, tend to volatilize from the catalyst composite, reducing its overall activity. However, when the distribution of the catalytically active compound throughout the alumina is extremely uniform, loss of these components appears to be repressed.

Aluminum salts that may be employed in the preparation of the catalyst include salts of hydrochloric acid, hydrobromic acid, hydrofluoric acid, sulfuric acid, carbonic acid, nitric acid, acetic acid, and oxalic acid. In general soluble aluminum salts which are decomposable to alumina when heated in the presence of the other ingredients of the catalyst to temperatures not substantially exceeding 850° C. may be employed. Aqueous solutions of the salts are generally preferable, although it is within the scope of the invention to employ other solvents which are substantially inert or non-reactive with the aluminum salts or with other ingredients employed in the manufacture. By inert or non-reactive it is meant that the solvent should not cause transformation of the ingredients into an insoluble or otherwise undesirable form. Mixtures of solvents may also be employed.

The volatilizable salts used in the present process include ammonium compounds such as ammonium chloride, ammonium sulfate, ammonium nitrate, ammonium acetate and the like. Substituted ammonium salts such as acid salts of hydrazine and acid salts of various organic amines and nitrogen basis may also be used. In general ammonium salts which are readily volatilizable at temperatures not substantially exceeding 850° C. and which when added to the solution containing the other soluble compounds cause no precipitation of alumina or of any other ingredient of the solution may be employed. Of the above named salts, ammonium salts of nitric and hydrochloric acids are preferred.

The compound which constitutes the source of the other catalytic substance also must possess certain properties, namely, it must not cause precipitation when added to the solution containing the aluminum and ammonium salts, and it must be decomposable at a temperature not substantially exceeding 850° C. to the catalytic substance, which is usually an oxide. The types of compounds which are employed for this purpose will be more fully described later.

After all of the ingredients have been combined in the solvent without precipitation of alumina or of any other ingredient, the solvent is evaporated from the solution by the application of heat, leaving a relatively dry residue. The ammonium salt is then volatilized by heating the dry solid material to a higher temperature, usually not substantially exceeding 850° C. and at the same time, the aluminum salt and the added compound decompose to form an active alumina and an active catalytic substance, usually an oxide, respectively. For example, if ammonium molybdate is employed as the added compound which will give rise to a catalytically active substance, the molybdate is decomposed to form oxides of molybdenum. If organic salts were used in the preparation, carbonaceous residues resulting from the decomposition of these salts may conveniently be removed during calcination, or at any other time, by combustion.

Ordinarily, calcination temperatures below about 900° C. are employed in the final heating step. The exact temperature of calcination is dependent upon the time of calcination, upon the volatilization temperature of the ammonium salt, upon the decomposition temperature of the aluminum salt and of the non-aluminiferous compound, and upon various other factors. As previously pointed out, the catalyst prepared by this process is able to withstand higher temperatures than previously prepared catalysts of the same chemical composition or is able to withstand the same high temperatures for a longer period of time without undergoing excessive loss in catalyst activity. Nevertheless, temperatures greatly in excess of 900° C. and times of calcination which would tend to convert the alumina in the catalyst to the $\alpha$ alumina form should be avoided. The final catalyst composite may be ground for use in powder condition or it may be formed into pellets by compression or extrusion methods. In some cases, it may be desirable to pulverize and compress the catalyst before the final calcination step since in this manner the compression operation is made less difficult. In forming pellets, suitable well-known lubricants may be employed.

It is within the scope of this invention to subject the calcined composites to further modifying steps to produce catalysts of high activity. Thus, for example, catalysts containing oxides of nickel, copper, cobalt, iron, etc. in association with alumina may be used for hydrogenation without further treatment, or they may be reduced with hydrogen prior to use in such processes in order to reduce a portion of the metallic oxides other than alumina to the metallic form. In still other cases, the oxides other than the alumina may be converted to sulfides by treatment with hydrogen sulfide, for example, an alumina-molybdenum sulfide catalyst for use in dehydrogenation, hydrogenation or desulfurization processes.

It is also within the scope of this invention to associate more than one catalytic substance with the alumina. A few examples of such multi-component catalysts are alumina-copper-nickel, which may be used as a hydrogenation catalyst, alumina-molybdena-magnesia, alumina-chromia-magnesia, alumina-molybdena-zinc oxide, and alumina-molybdena-titania, which may be used for reforming gasolines, for dehydrogenation, and the like.

Catalysts made by the present process may, as previously noted, be used to advantage in dehydrogenation processes, i. e., in the splitting of hydrogen from the molecule to produce an unsaturated derivative or in the splitting of hydrogen together with cyclization to produce aromatics. An example of simple dehydrogenation is the formation of butenes from butane, while an example of dehydrogenation coupled with cyclization is the formation of toluene from n-heptane. Also as previously noted, the catalysts of this invention may be employed in reforming naphtha fractions to increase the octane number thereof. A particularly advantageous use of a catalyst prepared by this process is in the "hydroforming" process in which a naphtha is reformed in the presence of added hydrogen containing gas without net consumption of hydrogen.

Typical catalysts which may be used with varying degrees of effectiveness in dehydrogenation, dehydrocyclization, or reforming reactions include various reducible metal oxides associated with alumina. This group includes oxides which under valence change during alternate processing and regenerating treatment.

The oxides of the elements appearing in the left hand column of group VI of the periodic table and particularly the oxides of chromium, molybdenum and tungsten are extremely useful. Another useful class of oxides which may be used in association with alumina includes the oxides of elements in the left hand column of group V, particularly vanadium, columbium and tantalum. Still another group includes oxides of elements in the left hand column of group IV, particularly cerium, thorium, zirconium, and titanium. Still another group which may be used are the oxides of the right hand column of group II including magnesium, zinc, and cadmium.

Of all of the oxides falling within one or more of the above classifications, those most generally applicable to dehydrogenation including the reforming of gasoline are the oxides of molybdenum, chromium, vanadium, cerium, tungsten, zinc and magnesium. These oxides in association with alumina may be used for the dehydrogenation of aliphatic compounds to produce mono-olefins and diolefins, for the dehydrogenation of naphthenes to produce aromatics, and for the cyclization of straight-chain aliphatic hydrocarbons containing at least six carbon atoms. In the dehydrogenation of naphthenes a further class of substances associated with alumina and comprising elements or compounds of elements of group VIII, particularly of iron, nickel, cobalt, platinum and palladium may be employed.

In employing these catalysts the conventional contacting methods may be used. For example, the hydrocarbon gases may be passed through a bed of granular catalyst, such catalyst being periodically reactivated to restore its activity. In an alternative operation, the charging material may be bubbled upward in vaporous form through a turbulent bed of powdered catalyst, said catalyst being regenerated either in situ or in an extraneous regeneration zone. In the latter case the catalyst may be continuously withdrawn from and supplied to the processing and the regenerating zone.

The following are examples of the manufacture of the catalyst composites and a description of the processes in which they may be used. These examples are illustrative and are not intended unduly to limit the invention.

The term "liquid space velocity" as used herein is defined as the volume of hydrocarbon measured at room temperature charged per hour per bulk volume of granular catalyst. Similarly, the term "gas space velocity" as used herein is defined as the volume of hydrocarbon measured as a gas at standard conditions charged per hour per bulk volume of granular catalyst.

*Example I.*—To demonstrate the superior qualities of the improved catalyst the following example illustrates the type of results that one may expect when using an alumina molybdena catalyst, prepared according to the process of this invention, in the hydroforming process. In hydroforming, temperatures usually range from 400–700° C., pressures from 50 pounds to 500 pounds, gas recycle rates from 0.5 to 15 mols of gas (rich in hydrogen) per mol of liquid charge, and process periods from 0.5 to 12 hours.

The catalyst of the present invention is prepared by adding to six liters of water 1446 grams of aluminum chloride hexahydrate, 33.3 grams of a hydrated ammonium molybdate (containing 81% by weight of $(NH_4)_2MoO_4$), and 321 grams of $NH_4Cl$. The resulting solution is evaporated in an oven maintained at 120° C., and dried. The dried catalyst powder is purified by heating at about 370° C. for eight hours, this heating serving to vaporize the major portion of the ammonium chloride. The purified catalyst is then ground, formed into 1/8 inch cylindrical pellets and heated in air for two hours at 600° C. to remove the lubricant. The catalyst is then finally calcined for 6 hours at 750° C. In this way, a catalyst is obtained comprising alumina molybdena and containing about 7.3 weight per cent $MoO_3$.

A catalyst thus prepared is compared with another catalyst made by impregnating 1/8 inch pellets of an Activated Alumina of commerce with ammonium molybdate solution followed by a 6 hour calcination at 750° C., resulting in a catalyst having approximately the same chemical composition.

Each catalyst is tested under the following test conditions: temperature, 505° C.; pressure, 100 pounds per square inch; liquid space velocity, 1; added hydrogen, 3.4 mols per mol of naphtha; process period, 6 hours. The charging stock for each test is a 36.5 octane number Mid-Continent naphtha having a boiling range of from 103 to 207° C. Under these conditions the catalyst of the invention will yield 85.4% by weight of gasoline having a Motor-Method octane number (10 pounds Reid vapor pressure) of 77. In comparison, the impregnated catalyst has low activity producing 88% of 67.7 Motor-Method octane number gasoline.

The carbon formed on the impregnated catalyst amounts to about 0.4% of the charge, whereas if the test conditions are made more severe on the impregnated catalyst in order to obtain a product having a 77 octane number, about 0.7% carbon is deposited on the impregnated catalyst.

*Example II.*—Catalysts consisting of alumina and vanadia manufactured according to the process of this invention are superior to catalysts of similar composition made by impregnation methods for reforming process particularly on the basis of resistance to loss of activity on high temperature calcination. An alumina-vanadia catalyst is made, according to the process of the invention, by preparing a solution of aluminum nitrate, ammonium vanadate and ammonium nitrate, thereafter evaporating the solution to form a dry residue, and calcining the dry residue at 750° C. to volatilize the ammonium salt and to decompose the aluminum nitrate and the ammonium vanadate. In comparing this catalyst with a conventional catalyst prepared by impregnation methods and having approximately the same chemical composition, tests are made at the conditions described in Example I. The following data are obtainable; the improved catalyst yields about 86% of 74.5 octane number gasoline while the impregnated catalyst after calcination at 750° C. yields only 90% of 60 octane number gasoline.

*Example III.* — Dehydrogenation of butane and/or normal butene to butadiene may be carried out with a catalyst of the general type described. In this operation temperatures range from 450–700° C., low pressures preferably subatmospheric, gas space velocities of from 100 to 2000 and processing periods less than 2 hours are generally preferred.

Catalysts which may be used for this process include alumina associated with molybdena, chromia, vanadia or ceria, together with relatively minor portions of the oxides of zinc or magnesium, if desired. The relative proportions of alumina and the added oxide or oxides depend to a large extent upon which catalytic substance is employed, although ordinarily the alumina is the major constituent.

The catalyst of the present invention is prepared by evaporating a solution of aluminum nitrate, chromic acid, magnesium chromate and ammonium nitrate followed by heating of the solid to volatilize the ammonium nitrate and to decompose the metallic salts to the corresponding oxides. The mass is powdered, pilled, and then calcined at 700° C. for 6 hours. When the catalyst is employed to dehydrogenate a normal butane-normal butene mixture containing approximately 40% olefins to produce butadiene at a temperature of 675° C. a pressure of 80 mm. of mercury absolute, a gas space velocity of 1300 and a process period of 30 minutes, approximately 25% of butadiene may be obtained on a once-through basis, resulting in a carbon deposition of 1.25%.

For comparison, an impregnated catalyst is prepared by impregnating activated alumina with chromic acid and magnesium nitrate followed by calcination at 700° C. for 6 hours. The impregnated catalyst comprises alumina, chromia, and magnesia in approximately the same proportions as does the improved catalyst. When operating with the impregnated catalyst at a temperature of 675° C. and at a pressure of 80 mm. of mercury, a gas space velocity of approximately 800 is required to reach the same once through conversion to butadiene and the resulting carbon deposition is increased to over 2%. The advantages of the improved catalyst are obvious by comparison of the data.

*Example IV.*—Aliphatic hydrocarbons containing more than five carbon atoms per mol may be converted into aromatics by treatment with catalysts of the character described. As a rule, operating temperatures for this process will range from 450 to 700° C., liquid space velocity less than 10, pressures usually superatmospheric and process periods less than 10 hours. Hydrogen may be added during processing.

Catalysts comprising alumina in association with reducible oxides having more than one valence state are suitable for this process. The oxides of the elements of the left hand columns of groups IV, V and VI, and especially of molybdenum, chromium and vanadium are preferred as the associating oxides. When operating with the impregnated catalyst to produce a yield of approximately 60% toluene from a narrow boiling normal heptane fraction in the presence of added hydrogen approximately 2.5% carbon on the catalyst will result, while with the improved catalyst the amount of carbon for the same toluene yield is reduced to less than 1.5% carbon. The advantage of using the improved catalyst, particularly with regard to the reduction in the regeneration cost is apparent.

*Example V.*—In the dehydrogenation of naphthenic hydrocarbons containing six membered rings to produce aromatic hydrocarbons, the improved catalysts are especially effective. A typical catalyst may be prepared by evaporating a solution of aluminum chloride, cobalt chloride and ammonium chloride to dryness; thereafter calcining the dried composite at a temperature of about 400° C. The mass is then heated at that temperature in the presence of hydrogen to form a substantial amount of metallic cobalt. This catalyst when used for the dehydrogenation of cyclohexane to produce benzene at 300° C. results in a yield of about 10% more benzene per pass than is obtained when an alumina cobalt catalyst of substantially the same chemical composition, but made by impregnation methods, is employed.

A similar catalyst made from nickel chloride instead of cobalt chloride is likewise more effective in the dehydrogenation of methylcyclohexane to toluene at 350° C. than is the impregnated catalyst, resulting in an increase in the yield per pass of about 10%.

*Example VI.*—Active hydrogenation catalysts may also be prepared by the process of this invention. For example, a solution of aluminum nitrate, copper nitrate, nickel nitrate and ammonium nitrate is evaporated down to dryness, calcined, and reduced, to result in an alumina-metal catalyst containing about 8 parts by weight of alumina, 4 parts by weight of nickel, and 2 parts by weight of copper. A catalyst of similar composition is prepared according to conventional practice by precipitating a mixture of copper and nickel carbonates on activated alumina particles suspended in a solution of copper and nickel sulfates, followed by filtering, drying and reducing to form the alumina metal catalyst.

In hydrogenating octenes with the two catalysts at a temperature of 150° C., at atmospheric pressure, and with 50% excess hydrogen, a liquid space velocity of approximately 1.2 may be employed with the new catalyst in order to reach 95% saturation, while with the old catalyst, a liquid space velocity of .7 is required. The effect of the more active catalyst is therefore to greatly increase the permissible space velocity.

Similarly in the selective hydrogenation of olefins in the presence of aromatic compounds at temperatures ranging from about room temperature to 200° C. and at pressures ranging from atmospheric to 2000 pounds per square inch or more, a higher space velocity may be employed at the same operating conditions when using the improved catalyst.

In the hydrogenation of aromatics with an alumina-molybdenum sulfide catalyst prepared by treating the catalyst of Example I with hydrogen sulfide, a higher liquid space velocity may be employed in obtaining the same degree of hydrogenation than when an impregnated catalyst prepared by treating an impregnated alumina molybdena catalyst with hydrogen sulfide, is used.

*Example VII.*—In the destructive hydrogenation of higher boiling hydrocarbons either alone or in admixture with solid carbonaceous materials such as coal, the catalysts of the present invention may be employed to advantage. The preferred catalysts comprise associations of alumina with the oxides or sulfides of the left hand members of groups IV, V, VI and with the oxides or sulfides of group VIII. As a rule, the same degree of hydrogenation may be effected at a lower hydrogen pressure, when employing the improved catalyst than when the conventional catalysts are employed.

In this process, temperatures range from 375 to 600° C. and pressures from 500 to 3000 pounds.

*Example VIII.*—In cracking hydrocarbon oils, catalysts comprising alumina and boric oxide prepared by the process of this invention are highly suitable. In preparing the preferred catalysts for example, a solution of aluminum nitrate, boric acid and ammonium nitrate is evaporated down to dryness and calcined at 500° C. to remove ammonium nitrate and to decompose the aluminum salt. In comparing the activity of this catalyst with the impregnated type made by impregnating Activated Alumina with solutions of boric oxide, the activity of the improved catalyst is slightly better. However, after using the two catalysts for 30 days at the same conditions and with intermittent regeneration, the activity of the impregnated catalyst has decreased to less than half of its original value, whereas the activity of the improved catalyst is only slightly lower than its original value. It is evident, therefore, that the improved method of manufacture results in a catalyst of longer life.

*Example IX.*—An alumina base catalyst made by the general method of the invention may also be employed for the isomerization of olefins or for the "isoforming" of a thermally cracked or reformed gasoline to increase the octane number of the gasoline, principally by isomerization of olefins contained therein. According to one method of preparation, a solution of magnesium nitrate, aluminum chloride and ammonium chloride is evaporated to dryness and heated at about 400° C. to drive off ammonium compounds and to decompose the metallic salts to metallic oxides. The dried mass is then pulverized, pilled, and calcined at 600° C. to remove lubricants. The resulting catalyst comprising about 20% magnesia and 80% alumina on a dry basis is employed for "isoforming" an olefinic gasoline at a liquid hourly space velocity of 20, at a temperature of about 510° C. and for a process period of about 10 hours. The octane number of the gasoline is increased about 7 points by means of this treatment. In comparison, when standard catalyst prepared by impregnating Activated Alumina with a magnesium nitrate solution followed by calcination to give a catalyst having approximately the same chemical composition as the improved catalyst, is used, an increase of only 4 octane numbers of gasoline results. Similarly, when the improved catalyst is employed for isomerizing olefins, a higher space velocity may be employed with the improved catalyst than with the old to obtain the same conversion.

*Example X.*—In the dehydrogenation of paraffins to mono-olefins and particularly of butane to butene, the catalysts of the present invention show many advantages. Temperatures ranging from 400 to 700° C., pressures subatmospheric or superatmospheric less than 200 pounds, and gas space velocities of from 500 to 4000 are employed. For example, when the improved and the conventional catalysts of Example III are used to dehydrogenate n-butane, approximately ½ as much carbon is formed by the improved as by the conventional catalyst, and the permissible space velocity is much greater.

We claim as our invention:

1. A process for producing a catalytic composite of alumina and at least one other inorganic catalyst for hydrocarbon conversion reactions, which comprises adding a volatilizable ammonium salt to a solution of an aluminum salt and a compound which is decomposable to an inorganic oxide by heating, the composition of the resultant ammonium salt-containing solution being such as to preclude precipitation of the aluminum salt and said compound, evaporating the solvent from the solution, and heating the remaining residue sufficiently to volatilize the ammonium salt and to decompose the aluminum salt to alumina and said compound to said inorganic oxide.

2. A process for producing a catalytic composite of alumina and at least one other inorganic oxide which is catalytic with respect to hydrocarbon conversion reactions, which comprises adding a volatilizable ammonium salt to a solution of an aluminum salt and a compound which is decomposable to said other inorganic oxide by heating, said aluminum salt and said compound being decomposable to oxides at temperatures below 900° C. and the composition of the resultant ammonium salt-containing solution being such as to preclude precipitation of the aluminum salt and said compound, evaporating the solvent from the solution, and heating the remaining residue at below 900° C. sufficiently to volatilize the ammonium salt and to decompose said aluminum salt and said compound to oxides.

3. A process of catalyst manufacture which comprises adding a volatilizable ammonium salt to a solution containing an aluminum salt and a compound of a metal from the left-hand column of group VI of the periodic table which is decomposable to an oxide of said metal by heating, the composition of the resultant ammonium salt-containing solution being such as to preclude precipitation of the aluminum salt and said compound, evaporating the solvent from the solution, and heating the remaining residue sufficiently to volatilize the ammonium salt and to decompose said aluminum salt and said compound to oxides.

4. A process of catalyst manufacture which comprises adding a volatilizable ammonium salt to a solution containing an aluminum salt and a compound of a metal from the left-hand column of group V of the periodic table which is decomposable to an oxide of said metal by heating, the composition of the resultant ammonium salt-containing solution being such as to preclude precipitation of the aluminum salt and said compound, evaporating the solvent from the solution, and heating the remaining residue sufficiently to volatilize the ammonium salt and to decompose said aluminum salt and said compound to oxides.

5. The process as defined in claim 3 further characterized in that said metal is molybdenum.

6. The process as defined in claim 3 further characterized in that said metal is chromium.

7. The process as defined in claim 3 further characterized in that said compound is ammonium molybdate.

GLENN M. WEBB.
MARVIN A. SMITH.